May 24, 1938.　　　F. R. BROWN　　　2,118,485
ADJUSTABLE DEPTH CHUCK
Filed July 3, 1936
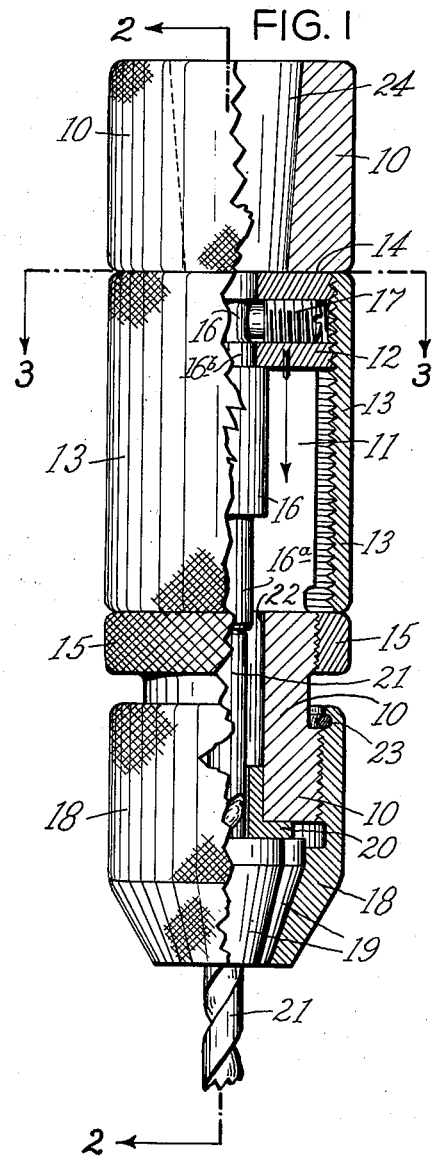
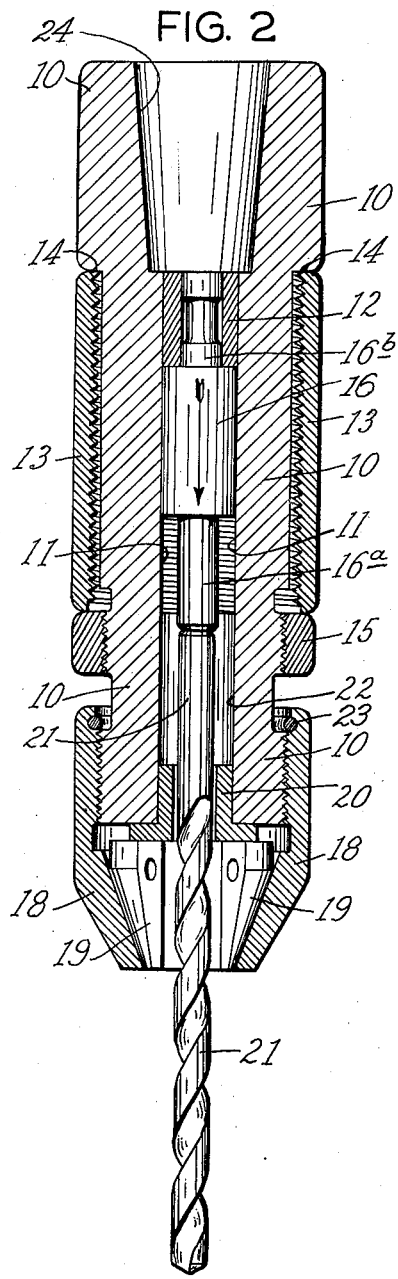
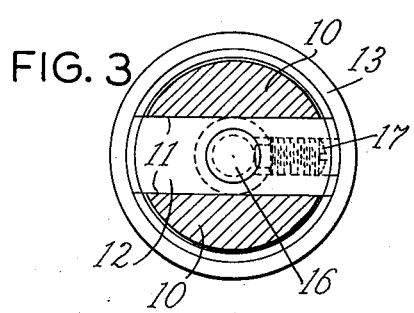
INVENTOR
Frederick R. Brown
BY George S. Hastings
ATTORNEY Patented May 24, 1938

2,118,485

UNITED STATES PATENT OFFICE 2,118,485

ADJUSTABLE DEPTH CHUCK

Frederick Russell Brown, Brooklyn, N. Y., assignor to American Machine & Foundry Company, a corporation of New Jersey Application July 3, 1936, Serial No. 88,741

1 Claim. (Cl. 279—9)

This invention relates to improvements in chucks, more particularly to drill chucks. Heretofore, most drill chucks relied on the pressure of the tool gripping jaws on the sides of the drill to prevent any slippage thereof.

The main object of the invention is to prevent end slippage of the tool in drill chucks. To this end the chuck is provided with a stop which abuts the inner end of the drill to prevent it from slipping endwise when under pressure in the work, thereby eliminating mutilation of drill shanks and strain on the chuck while permitting the drill to run true.

A further object of the invention is to permit manual adjustment of the stop to permit the drill to be set for different depths of holes. With this end in view, there is provided a hollow body within which the stop is mounted to abut the inner end of the drill, the stop being held by a block slidably mounted in a longitudinal slot in the body and surrounded by a sleeve which has threads engaging threads on the protruding ends of the block. By turning the sleeve the stop may be thus moved axially to set the drill for the desired depth of hole. Furthermore, the stop has a reduced portion which has a diameter small enough to enter between the tool gripping jaws, wherefore exceedingly short drill lengths may be used. With these and other objects not specifically mentioned in view, the invention consists in certain constructions and combinations hereinafter described and specifically set forth in the claim hereunto appended.

In the accompanying drawing, which forms a part of this specification and in which like characters of reference indicate the same or like parts:

Fig. 1 is a side elevation, partly shown in section of the adjustable depth chuck;

Fig. 2 is a sectional side elevation of the same taken on line 2—2 of Fig. 1; and Fig. 3 is a sectional plan view of the chuck, taken on line 3—3 of Fig. 1.

Referring to the drawing, wherein a suitable embodiment of the invention is illustrated, the adjustable depth chuck consists of a body 10 which is provided with an axial bore 22 and an elongated central slot 11 in its mid-section. Within the said bore is slidably mounted a block 12 having threaded ends which protrude through the slot into engagement with an internally threaded sleeve 13 loosely mounted on the midsection of the body 10. Sleeve 13 can be locked against a shoulder 14 of the upper portion of body 10 by a threaded lock ring 15 screwed on to said body in position to engage the lower end of the sleeve. A stop pin 16 slidably mounted in the bore of the body has a stem 16b which projects up into a bore in the block 12, and is retained therein by a set screw threaded into a hole in one end of the block and engaging a circumferential groove in the stem 16b. The lower end of the body 10 is provided with an internally threaded shell 18 carrying a number of jaws 19 which are urged apart by compression springs (not shown) interposed between adjacent jaws, and are normally held in contact with a pressure bushing 20 loosely mounted in the lower end of the bore 22. The construction of these jaws and compression springs is old and well known.

The drill 21 is inserted upwardly between the jaws 19 into the bore 22 of the body 10 until the shank end of said drill contacts the end of the spindle 16a of stop pin 16. Thereupon, by turning sleeve 13, the block 12 may be moved up or down within slot 11 to adjust the stop pin 16 to any desirable position; and, being in contact with drill 21, the latter can be thus set to protrude any desired distance from the shell 19 in accordance with the depth of the hole to be drilled. In order to prevent block 12 or sleeve 13 from moving during the drilling operation, the lock ring 15, after positioning of the drill 21, is screwed tight against said sleeve 13. After accomplishing the correct setting of said drill, the shell 18 is turned and tightened in the conventional manner causing jaws 19 to close and clamp drill 21. The latter is then ready for the drilling operation, and rigidly held and supported at all times.

Besides setting the drill for the required depth of hole, another advantage of this adjustment of the stop relative to the tool gripping means lies in the possibility of using drills having broken shanks. Moreover by replacing stop pin 16 by a shorter or longer pin, drills of any standard length may be used in connection with the adjustable depth chuck described herein. Since the reduced portion of the stop may enter between the tool gripping jaws, drills of excessively short length may be used. Thus even the fluted portions which may occasionally break off the drills can be utilized.

The shell 18 is retained against rotation after it has been screwed up on the body 10 to bring the jaws 19 into gripping relation with the tool, by a lock spring 23 located in an internal annular groove in the upper end of the shell. An internal taper 24 is provided in the upper end of the body 10 to fit a driving spindle (not shown) whereby the drill is driven, and this taper may be threaded if necessary.

What is claimed is:

In a variable depth chuck having an elongated, externally threaded body portion with an axial bore intersected by radial slots, with an internally threaded adjusting sleeve located about a part of said portion and in threaded engagement therewith, and a clamp ring positioned on said portion to engage said sleeve for locking it in adjusted position thereon, and tool gripping jaws movable transversely of said bore to grip and release a tool, and a chuck cap secured to said body portion and arranged to effect movement of said jaws to and from tool gripping position; a plunger movable in said bore, a reduced portion on said plunger constructed and arranged to abut against the end of a tool held by said jaws to prevent axial movement thereof, said reduced portion being of such size that it can be moved between said jaws to back up said tool free from interference with said jaws while said tool is gripped therein, and means for coupling said plunger to said sleeve for axial adjustment in said bore, whereby said plunger may be removed and other plungers provided with reduced portions of different dimensions may be substituted therefor in said bore.

FREDERICK RUSSELL BROWN.